United States Patent
Kim et al.

(10) Patent No.: US 10,362,559 B2
(45) Date of Patent: Jul. 23, 2019

(54) METHOD FOR SUPPORTING DEVICE-TO-DEVICE DIRECT COMMUNICATION IN WIRELESS COMMUNICATION SYSTEM, AND APPARATUS THEREFOR

(71) Applicant: LG ELECTRONICS INC., Seoul (KR)

(72) Inventors: Taehun Kim, Seoul (KR); Sungduck Chun, Seoul (KR); Laeyoung Kim, Seoul (KR); Jaewook Lee, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 15/750,804

(22) PCT Filed: Sep. 7, 2016

(86) PCT No.: PCT/KR2016/010007
§ 371 (c)(1),
(2) Date: Feb. 6, 2018

(87) PCT Pub. No.: WO2017/043854
PCT Pub. Date: Mar. 16, 2017

(65) Prior Publication Data
US 2018/0234942 A1 Aug. 16, 2018

Related U.S. Application Data

(60) Provisional application No. 62/215,044, filed on Sep. 7, 2015.

(51) Int. Cl.
*H04W 68/02* (2009.01)
*H04W 76/10* (2018.01)
(Continued)

(52) U.S. Cl.
CPC ......... *H04W 68/02* (2013.01); *H04L 61/2015* (2013.01); *H04L 61/2076* (2013.01);
(Continued)

(58) Field of Classification Search
None
See application file for complete search history.

(56) References Cited

U.S. PATENT DOCUMENTS 8,666,403 B2 * 3/2014 Yu .................... H04W 60/00
455/435.1
10,009,936 B2 * 6/2018 Watfa ................. H04W 76/14
(Continued)

FOREIGN PATENT DOCUMENTS

| WO | 2013090809 A1 | 6/2013 |
| WO | 2015026111 A1 | 2/2015 |
| WO | 2015047167 A1 | 4/2015 |

OTHER PUBLICATIONS

Huawei, HiSilicon; "D2D synchronization procedure for out-of-coverage," 3GPP TSG RAN WG1 Meeting #78, Aug. 18-22, 2014, R1-142845.
(Continued)

*Primary Examiner* — Charles N Appiah
*Assistant Examiner* — Frank E Donado
(74) *Attorney, Agent, or Firm* — Dentons US LLP

(57) ABSTRACT

Disclosed are a method for supporting direct communication, and a network entity, the method receiving, from a relay UE, a message which notifies that it is not necessary to perform paging to a remote UE since a direct link to the remote UE is set, and transmitting, to a network entity, a message which notifies that it is not necessary to perform paging to the remote UE.

20 Claims, 19 Drawing Sheets

(51) Int. Cl.
*H04W 76/14* (2018.01)
*H04W 88/04* (2009.01)
*H04W 8/00* (2009.01)
*H04L 29/12* (2006.01)
*H04W 8/18* (2009.01)
*H04W 8/26* (2009.01)

(52) U.S. Cl.
CPC ...... *H04L 61/2092* (2013.01); *H04L 61/6059* (2013.01); *H04W 76/10* (2018.02); *H04W 76/14* (2018.02); *H04W 8/005* (2013.01); *H04W 8/18* (2013.01); *H04W 8/26* (2013.01); *H04W 88/04* (2013.01)

(56) References Cited

U.S. PATENT DOCUMENTS

| | | | | |
|---|---|---|---|---|
| 2013/0287012 A1* | 10/2013 | Pragada | ................ | H04W 76/25 370/338 |
| 2013/0288668 A1* | 10/2013 | Pragada | ................ | H04W 12/06 455/426.1 |
| 2014/0120907 A1* | 5/2014 | Yu | ........................ | H04W 60/00 455/426.1 |
| 2014/0295827 A1* | 10/2014 | Tesanovic | ............ | H04W 76/14 455/426.1 |
| 2016/0100442 A1* | 4/2016 | Xu | ........................ | H04W 76/14 370/329 |
| 2016/0119963 A1* | 4/2016 | Casati | .................... | H04W 76/14 455/434 |
| 2016/0143080 A1* | 5/2016 | Enomoto | .............. | H04W 8/005 370/329 |
| 2016/0227385 A1* | 8/2016 | Ahmad | ............... | H04L 65/4061 |
| 2016/0302119 A1* | 10/2016 | Chen | ................... | H04W 56/002 |
| 2016/0309447 A1* | 10/2016 | Agiwal | ................. | H04W 76/14 |
| 2017/0215224 A1* | 7/2017 | Ke | ........................ | H04W 8/005 |
| 2017/0245315 A1* | 8/2017 | Watfa | .................... | H04W 76/14 |

OTHER PUBLICATIONS

"3rd Generation Partnership Project; Technical Specification Group Services and System Aspects; Proximity-based services (ProSe); Stage 2 (Release 13)," 3GPP TS 23.303 V13.0.0 (Jun. 2015).

* cited by examiner (a) UE-1 and UE-2 camp on different eNodeBs (b) UE-1 and UE-2 camp on the same eNodeB

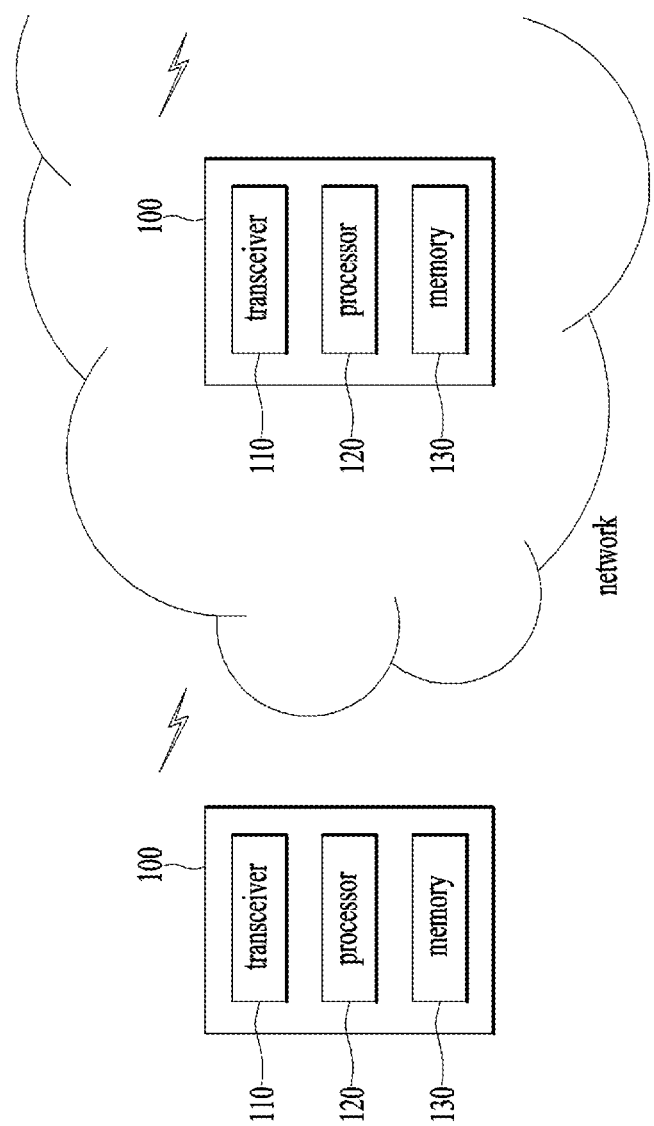

METHOD FOR SUPPORTING DEVICE-TO-DEVICE DIRECT COMMUNICATION IN WIRELESS COMMUNICATION SYSTEM, AND APPARATUS THEREFOR

This application is the National Phase of PCT International Application No. PCT/KR2016/010007, filed on Sep. 7, 2016, which claims priority to U.S. Provisional Application No. 62/215,044, filed on Sep. 7, 2015, which are hereby incorporated by reference herein in their entirety.

TECHNICAL FIELD

The present invention relates to a wireless communication system, and more particularly, to a method performed by a network entity for supporting device-to-device (D2D) direct communication in a D2D direct communication (e.g., ProSe communication) environment and apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

An object of the present invention is to improve a method performed by a network entity for supporting D2D direct communication in a ProSe communication process.

Another object of the present invention is to reduce unnecessary signaling overhead associated with a remote UE that performs D2D direct communication.

A further object of the present invention is to improve IP address switching for network communication based on movement of a remote UE.

The technical problems solved by the present invention are not limited to the above technical problems and other technical problems which are not described herein will become apparent to those skilled in the art from the following description.

Technical Solutions

To achieve these objects and other advantages, in an aspect of the present invention, provided herein is a method for supporting direct communication, including: receiving, from a relay UE, a first message indicating that since a direct connection with a remote UE that moved out of coverage of a network is established, paging to the remote UE is not required; and transmitting, to a second network entity, a second message indicating that the paging to the remote UE is not required, wherein each of the first and second messages may include an identifier of a Mobility Management Entity (MME) that supported the remote UE and an indicator indicating that the remote UE is connected to the network through the relay UE.

Each of the first and second messages may include the identifier of the MME that supported the remote UE as a Globally Unique Temporary Identifier (GUTI) of the remote UE or a Globally Unique MME Identifier (GUMMEI) of the MME.

The indicator may indicate that the MME that supported the remote UE will delete context information of the remote UE, that the MME that supported the remote UE will detach a connection with the remote UE, or that the MME that supported the remote UE will set a state of the remote UE to 'not reachable'.

The first network entity may be an MME supporting the relay UE, and the second network entity may be a Home Subscriber Server (HSS). In addition, the first message may be a Remote UE Report Request message, and the second message may be a message transmitted through an S6a interface.

When receiving the second message from the second network entity, the MME that supported the remote UE may stop the paging to the remote UE.

In another aspect of the present invention, provided herein is a first network entity, including: a transmitter, a receiver, and a processor connected to the transmitter and the receiver, wherein the processor may be configured to: receive, from a relay UE, a first message indicating that since a direct connection with a remote UE that moved out of coverage of a network is established, paging to the remote UE is not required; and transmit, to a second network entity, a second message indicating that the paging to the remote UE is not required, and wherein each of the first and second messages may include an identifier of a Mobility Management Entity (MME) that supported the remote UE and an indicator indicating that the remote UE is connected to the network through the relay UE.

In a further aspect of the present invention, provided herein is a communication method, including: establishing a direct connection with a remote UE that moved out of coverage of a network; and transmitting, to a network entity, a Remote UE Report Request message indicating that since the direct connection with the remote UE is established, paging to the remote UE is not required, wherein the Remote UE Report Request message may include an identifier of a Mobility Management Entity (MME) that supported the remote UE and an indicator indicating that the remote UE is connected to the network through the relay UE.

The Remote UE Report Request message may include the identifier of the MME that supported the remote UE as a Globally Unique Temporary Identifier (GUTI) of the remote UE or a Globally Unique MME Identifier (GUMMEI) of the MME.

The indicator may indicate that the MME that supported the remote UE will delete context information of the remote UE, that the MME that supported the remote UE will detach a connection with the remote UE, or that the MME that supported the remote UE will set a state of the remote UE to 'not reachable'.

The network entity may be an MME supporting the relay UE.

In a still further aspect of the present invention, provided herein is a relay User Equipment (UE), including: a transmitter, a receiver, and a processor connected to the transmitter and the receiver, wherein the processor may be configured to: establish a direct connection with a remote UE that moved out of coverage of a network; and transmit, to a network entity, a Remote UE Report Request message indicating that since the direct connection with the remote UE is established, paging to the remote UE is not required, wherein the Remote UE Report Request message may include an identifier of a Mobility Management Entity (MME) that supported the remote UE and an indicator indicating that the remote UE is connected to the network through the relay UE.

Advantageous Effects

As is apparent from the above description, the embodiments of the present invention have the following effects.

First, a method for supporting D2D direct communication can be improved, thereby preventing network entities from wasting radio resources.

Second, it is possible to reduce unnecessary signaling associated with a remote UE performing D2D direct communication.

Third, an IP address allocation method for a remote UE can be improved, thereby simplifying a UE's network connection process.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 23 is a diagram illustrating configurations of node devices according to a proposed embodiment.

BEST MODE FOR INVENTION

Figure 1:
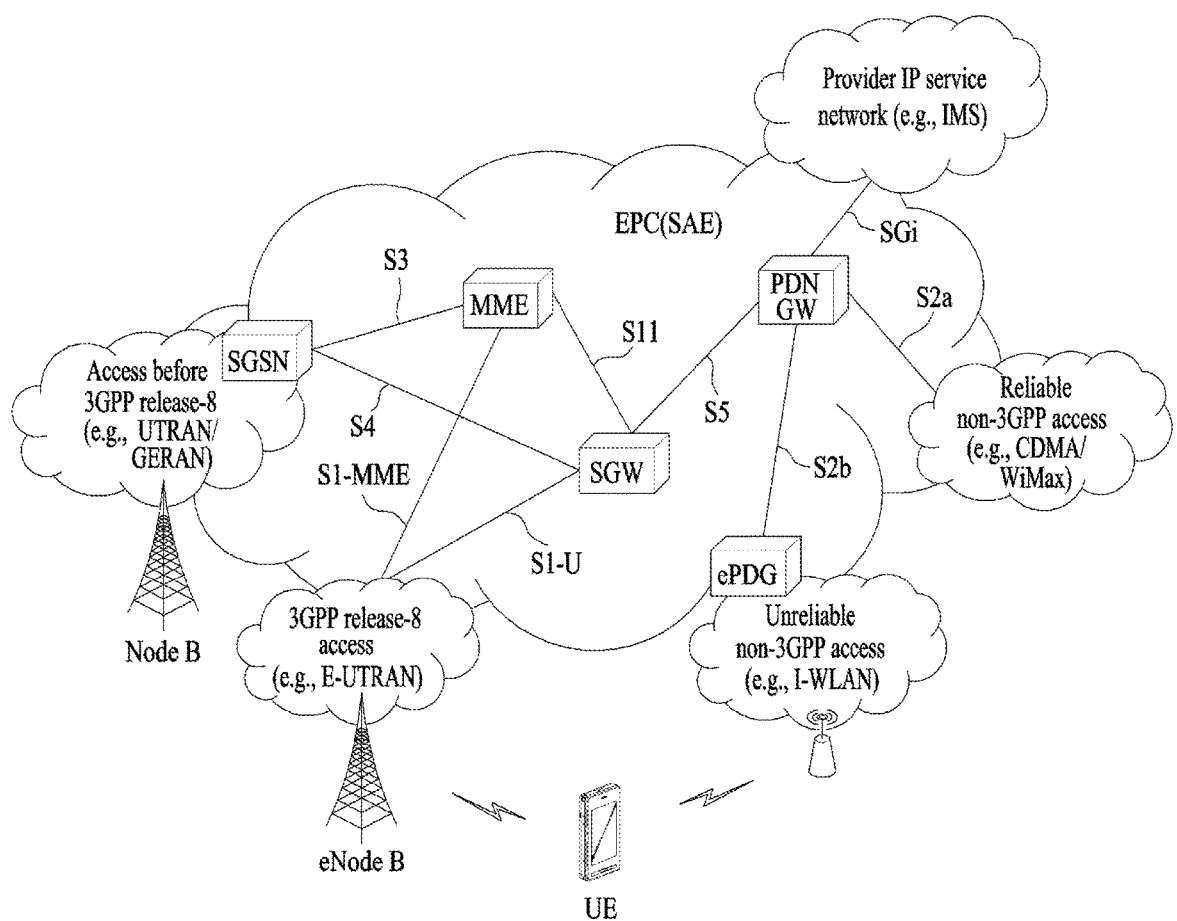
FIG. 1 is a diagram illustrating a brief structure of an EPS (evolved packet system) that includes an EPC (evolved packet core)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE)/LTE-Advanced (LTE-A) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16e-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

Terms used in the specification are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW/P-GW: a network node of an EPS network, which performs UE IP address allocation, packet screening and filtering, charging data collection, etc.

SGW (Serving Gateway/S-GW: a network node of an EPS network, which performs mobility anchor, packet routing, idle-mode packet buffering, and triggering of an MME's UE paging.

PCRF (Policy and Charging Rule Function): a network node of an EPS network, which performs a policy decision to dynamically apply different QoS and charging policies for each service flow.

OMA DM (Open Mobile Alliance Device Management): a protocol designed to manage mobile devices such as a cell phone, a PDA, and a laptop computer, which performs functions such as device configuration, firmware upgrade, error report, and the like.

OAM (Operation Administration and Maintenance): a set of network management functions, which provides network error display, performance information, data, and management functions.

NAS (Non-Access Stratum): a higher stratum of a control plane between a UE and MME. As a functional layer for exchanging signaling and traffic messages between a UE and core network in LTE/UMTS protocol stack, the NAS supports UE mobility, a session management procedure for establishing and maintaining an IP connection between a UE and PDN GW, and IP address management.

AS (Access-Stratum): the AS includes a protocol stack between a UE and a radio (or access) network, which manages transmission of data and network control signals.

NAS configuration MO (Management Object): the NAS configuration MO is a management object (MO) used to configure parameters related to NAS functionality for a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a character string for indicating or identifying PDN. To access a requested service or network, a connection to a specific P-GW is required. The APN means a name (character string) predefined in a network to search for the corresponding P-GW (for example, it may be defined as internet.mnc012.mcc345.gprs).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

Remote UE: This is a ProSe-enabled Public Safety UE that is connected to an EPC network through a ProSe UE-to-network relay instead of being served by an E-UTRAN in UE-to-Network Relay operation. That is, a PDN connection is provided to the remote UE.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
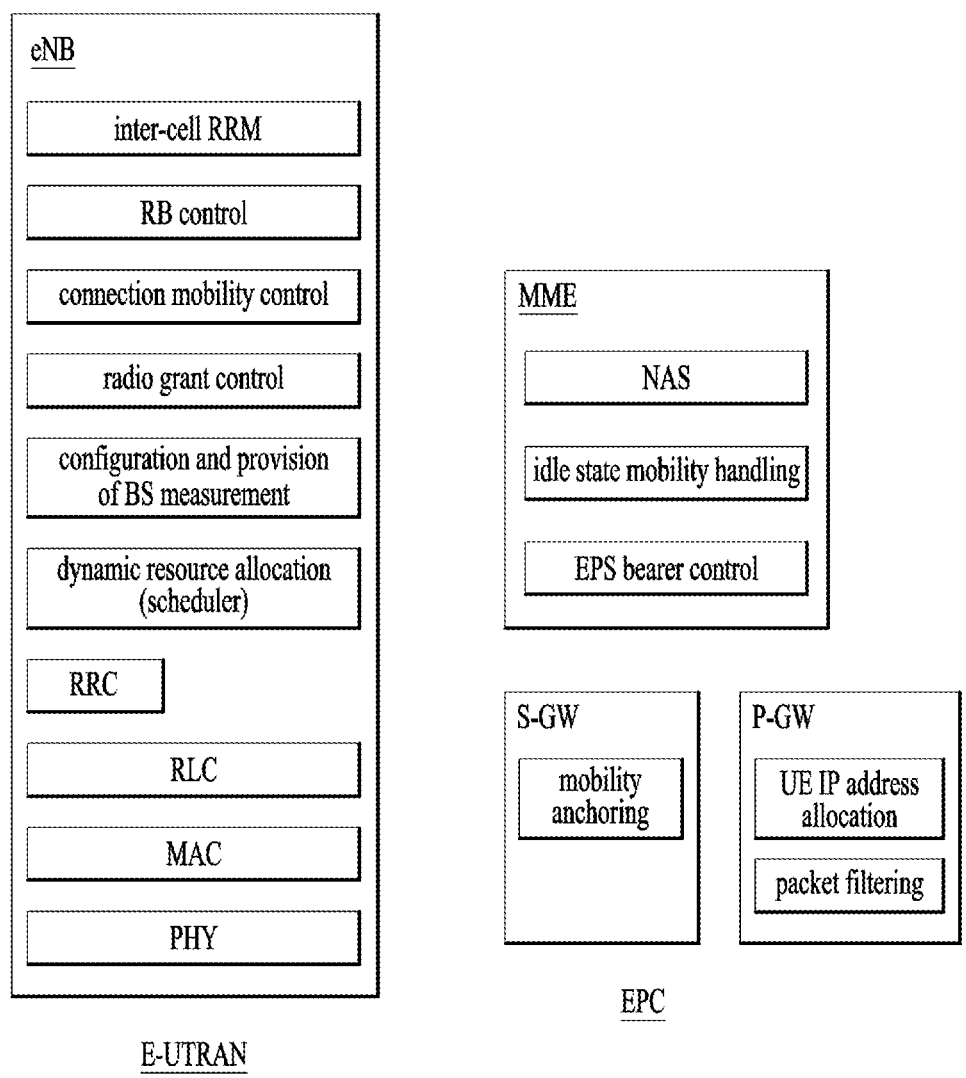
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
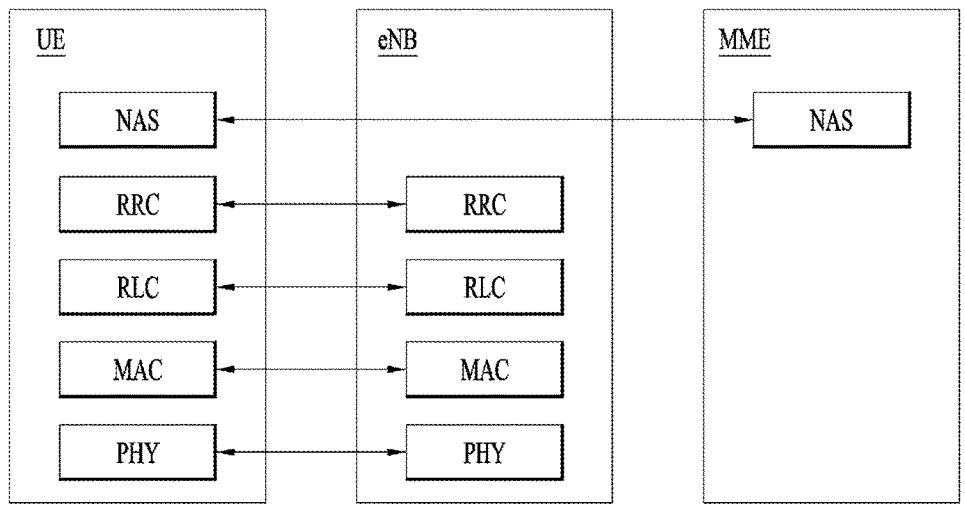
FIG. 3 is an exemplary diagram illustrating a structure of a radio interface protocol on a control plane.
Figure 4:
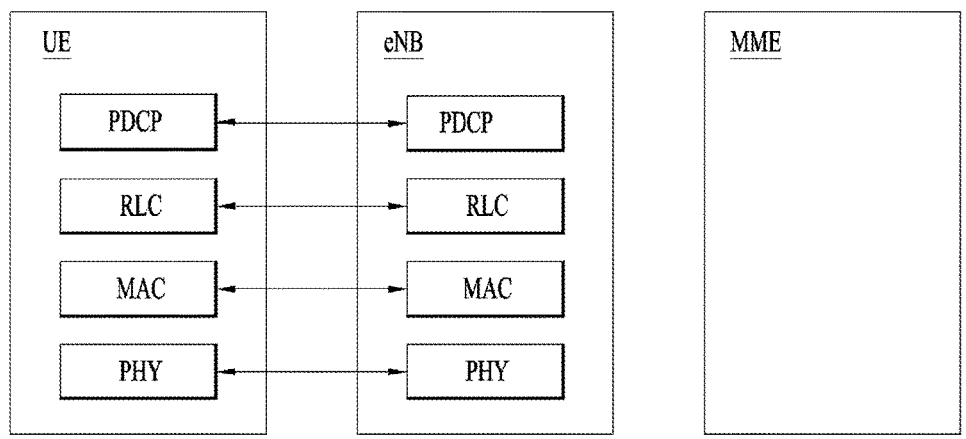
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of OFDM symbols in the time domain and a plurality of subcarriers. One subframe consists of a plurality of resource blocks. One resource block consists of a plurality of OFDM symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
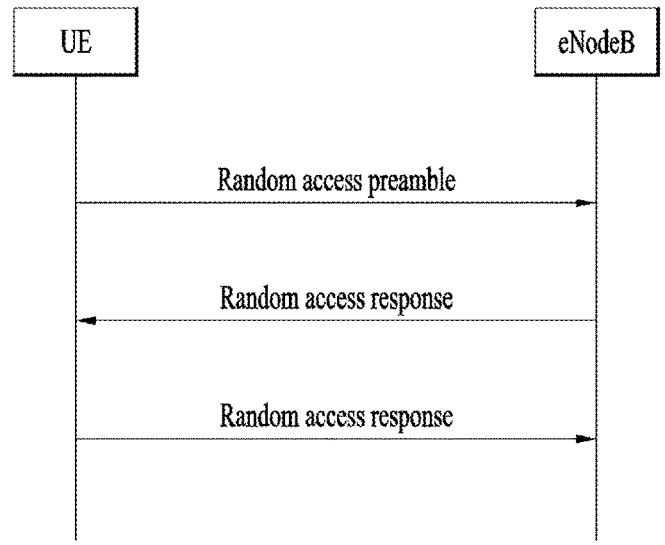
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
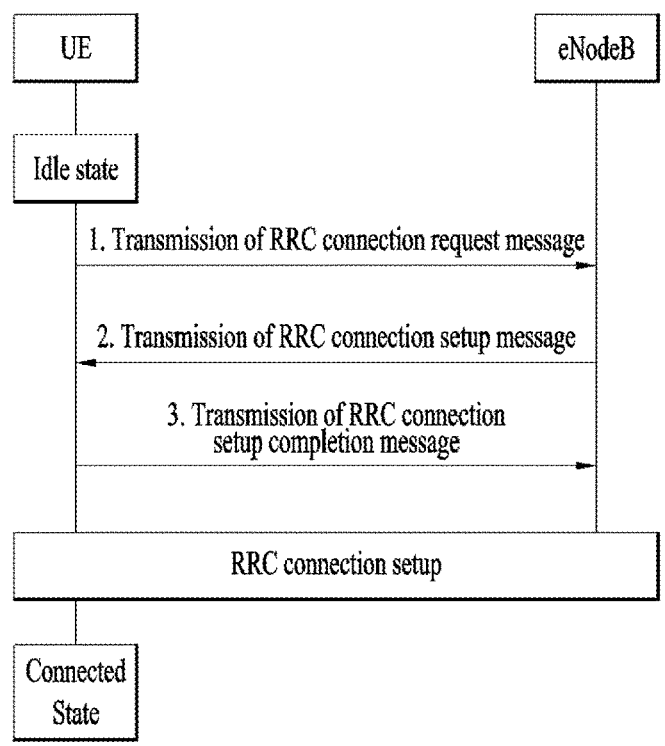
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. ProSe (Proximity Service)

As described above, ProSe service means a service that enables discovery between physically proximate devices and mutual direct communication, communication through a base station or communication through a third device.

Figure 7:
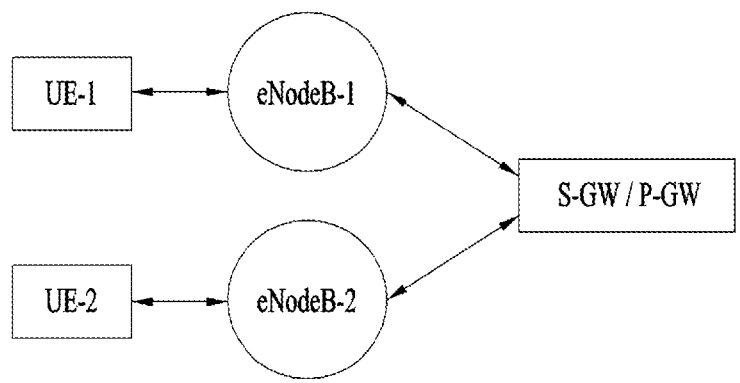
FIG. 7 illustrates a basic path for communication between two UEs in the EPS.

FIG. 7 illustrates a default data path through which two UEs perform communication with each other in an EPS. This default data path passes through an eNodeB and a core network (i.e., EPC), which are managed by an operator. In the present invention, this path will be referred to as an infrastructure data path (or EPC path). Also, communication through this infrastructure data path will be referred to as infrastructure communication.

Figure 8:
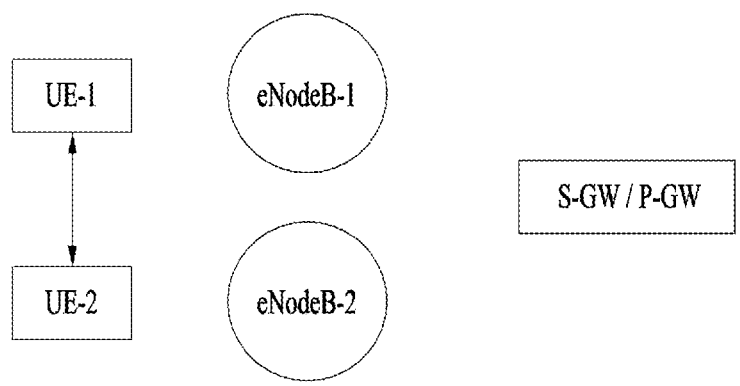
FIG. 8 illustrates a ProSe-based direct-mode communication path between two UEs.
Figure 8:
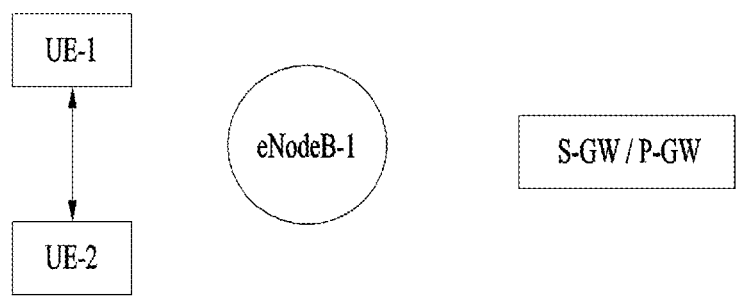

FIG. 8 illustrates a direct mode data path between two UEs based on ProSe. This direct mode communication path does not pass through the eNodeB and the core network (i.e., EPC), which are managed by an operator. FIG. 8(a) illustrates a case that UE-1 and UE-2 are camping on different eNodeBs and exchange data through a direct mode communication path. FIG. 8(b) illustrates a case that two UEs are camping on the same eNodeB and exchange data through a direct mode communication path.

Figure 9:
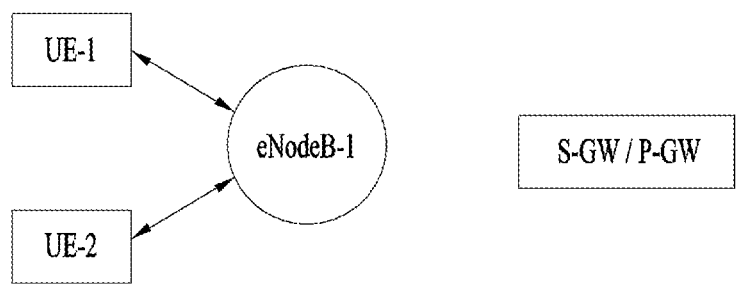
FIG. 9 illustrates a ProSe-based communication path between two UEs through an eNodeB.

FIG. 9 illustrates a locally routed data path through eNodeB between two UEs based on ProSe. This communication path through eNodeB does not pass through a core network (i.e., EPC) managed by an operator.

Figure 10:
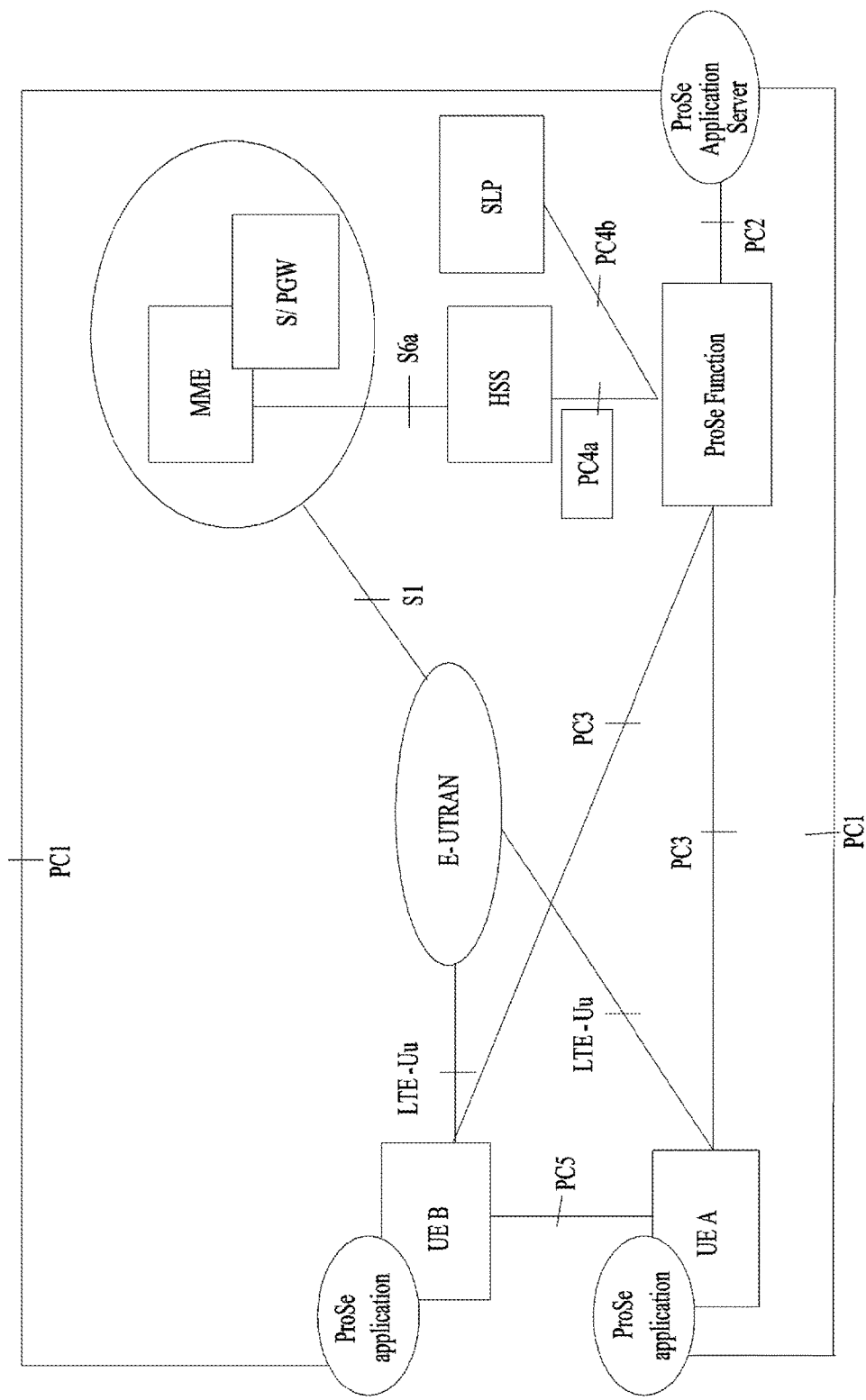
FIG. 10 illustrates a non-roaming reference architecture.

A non-roaming reference architecture is shown in FIG. 10. In the structure of FIG. 10, the EPC may determine proximity of two UEs and perform an EPC-level ProSe discovery procedure to notify the UE of the determined result. For this EPC-level ProSe discovery, a ProSe Function serves to determine proximity of two UEs and notify the UE of the determined result.

The ProSe function may retrieve and store ProSe associated subscriber data and/or ProSe associated subscriber data from HSS, and perform authentication and configuration for EPC level ProSe discovery and EPC sub WLAN direct discovery communication. Also, the ProSe function may be operated as a location service client that enables EPC level discovery, and may provide the UE of information for assisting WLAN direct discovery and communication. The ProSe function handles EPC ProSe User IDs and Application Layer User ID, and exchanges a signal with a third party application server for application registration identifier mapping. For transmission of a proximity request, proximity alerts and location report, the ProSe function exchanges a signal with a ProSe function of other PLMNs. In addition, the ProSe function provides various parameters required for ProSe discovery and ProSe communication. Details of the ProSe function are based on 3GPP TS 23.303.

Figure 11:
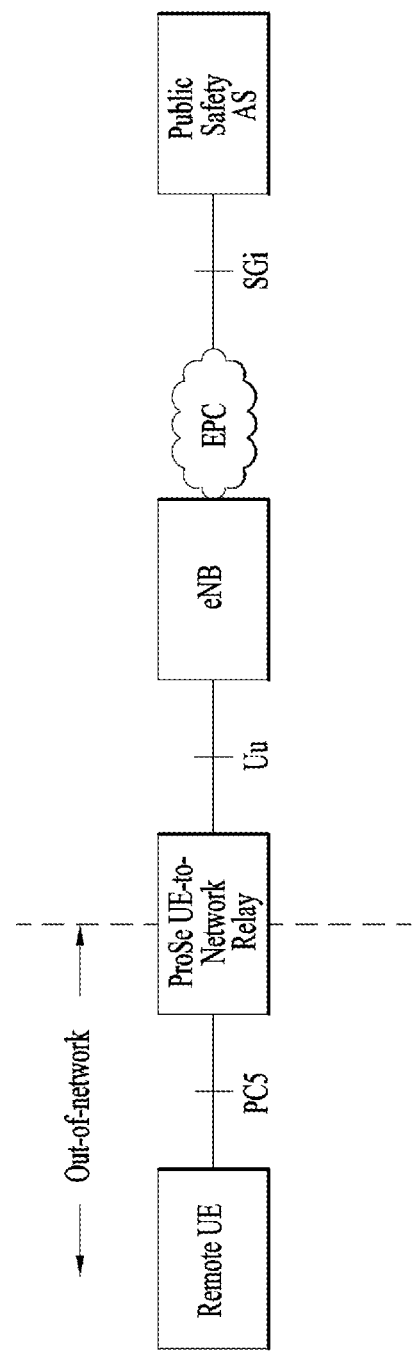
FIG. 11 is a diagram illustrating communication through a Prose UE-to-Network Relay.
Figure 12:
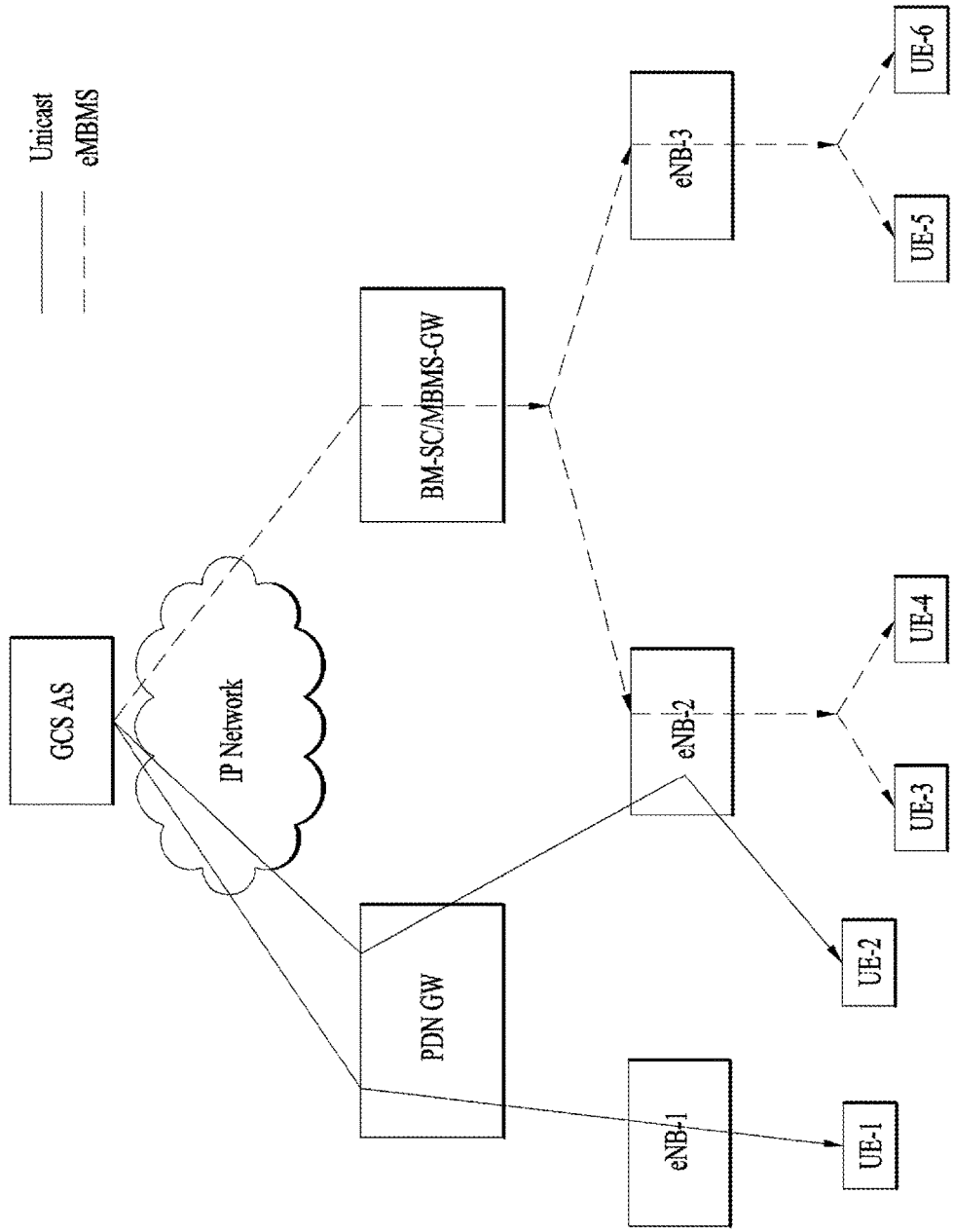
FIG. 12 is a diagram illustrating media traffic of group communication.

FIG. 11 illustrates communication through a ProSe UE-to-Network Relay. When a remote UE has connectivity to an EPC through a UE-to-network relay, the remote UE can communicate with an application server (AS) or participate in group communication. FIG. 12 shows an example in which a remote UE participate in group communication. UE-1 to UE-6 which are UEs belonging to the same group in FIG. 12 may receive downlink traffic through unicast or MBMS for specific media that configure group communication. As a result, although not in E-UTRAN coverage, the remote UE may transmit media traffic to other group members (that is, generate uplink traffic) by joining group communication through the UE-to-Network Relay or receive media traffic transmitted from other group members. In FIG. 12, a GCS AS (Group Communication Service Application Server) may serve to i) exchange GC1 signalling, ii) receive uplink data from a unicast UE, iii) transfer data to all UEs, which belong to a group, by using Unicast/MBMS delivery, iv) transmit application level session information through Rx interface to a PCRF, and v) support a service continuity procedure for a UE which is switched between Unicast Delivery and MBMS Delivery. The GCS AS, Public Safety AS, and GCSE AS (Group Communication Service Enabler Application Server) may be interpreted to refer to the same meaning and include AS that controls/manages communication joined by a plurality of UEs. Details of group communication is based on TS 23.468.

Figure 13:
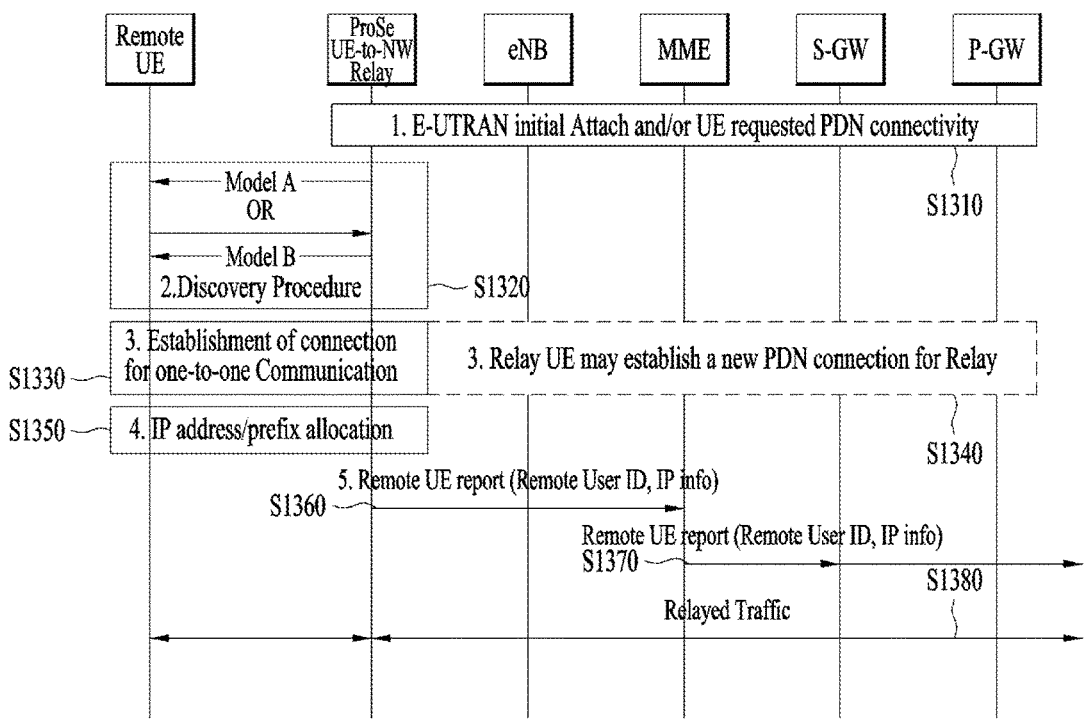
FIG. 13 is a diagram illustrating a procedure in which a remote UE performs direct communication through a UE-to-network relay.

FIG. 13 illustrates a procedure in which a remote UE that is not served by an E-UTRAN performs direct communication through a UE-to-network relay. A UE capable of operating as a ProSe UE-to-network relay may establish a PDN connection to provide relay traffic to the remote UE by accessing the network. The PDN connection supporting the UE-to-network relay is used only to provide the relay traffic to the remote UE.

First, a relay UE establishes a PDN connection through initial access to an E-UTRAN [S1310]. In the case of IPv6, the relay UE obtains an IPv6 prefix using a prefix delegation function. Next, the relay UE performs a discovery procedure, which differs depending on either Model A or Model B, together with a relay UE [S1320]. The remote UE selects the relay UE discovered through the discovery procedure and then establishes one-to-one direct connection [S1330]. If there is no PDN connection associated with a relay UE ID or if an additional PDN connection for relay operation is required, the relay UE initiates a new PDN connection procedure [S1340].

Next, an IPv6 prefix or an IPv4 address is allocated to the remote UE [S1350], and then uplink/downlink relay operation is initiated. When the IPv6 prefix is allocated, an IPv6 stateless address auto-configuration procedure configured with router solicitation signaling from the remote UE to the relay UE and router advertisement signaling from the relay UE to the remote UE is initiated. On the other hand, when the IPv4 address is allocated, an IPv4 address allocation using DHCPv4 procedure configured with DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE) is initiated.

Thereafter, the relay UE performs a Remote UE Report procedure for informing an MME that the relay UE is connected to the remote UE [S1360]. The MME performs a Remote UE Report Notification procedure to inform an SGW and a PGW that the new remote UE is connected [S1370]. Then, the remote UE performs communication with the network through the relay UE [S1380]. Details of the direct connection generation procedure could be found in TS 23.303.

3. Remote UE Report Procedure

Figure 14:
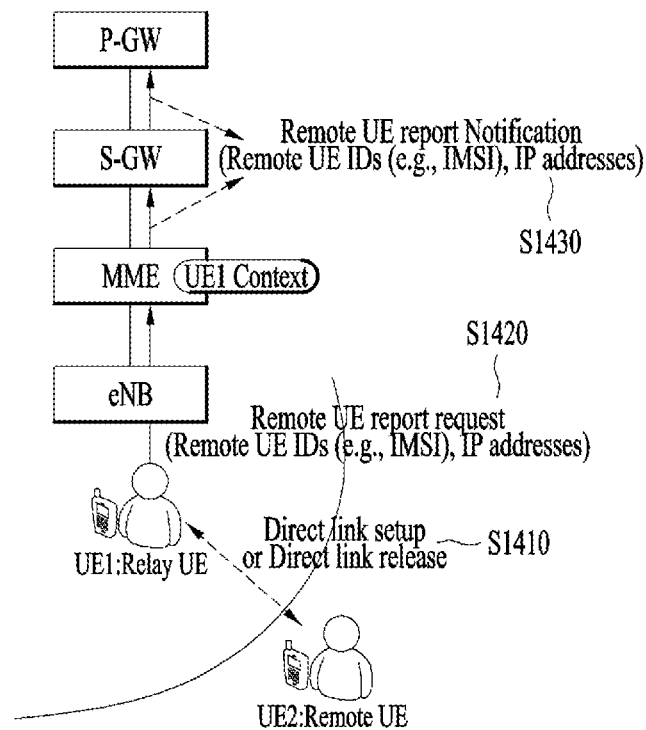
FIG. 14 is a diagram illustrating a Remote UE Report procedure.

FIG. 14 is a diagram illustrating a Remote UE Report procedure.

The Remote UE Report procedure means a procedure performed by a UE operating as a UE-to-network relay to inform the network that the UE is connected to or disconnected from a remote UE. If a direct connection (link) to the remote UE is established or released [S1410], the UE-to-network relay (or simply referred to as the relay UE) transmits a Remote UE Report message (or Remote UE Report Request message) to the network (e.g., MME) [S1420]. That is, the UE-to-network relay initiates the Remote UE Report procedure by transmitting the Remote UE Report message to the network and starting timer T3493. The Remote UE Report message includes information on a remote UE that is newly connected to or disconnected from the UE-to-network relay, and an international mobile subscriber identity (IMSI) as an ID of the remote UE. In addition, the UE-to-network relay may also transmit information on a default EPS bearer identity of a PDN connection related to the remote UE. Meanwhile, the network transmits a Remote UE Report Response message to the relay UE in response to the Remote UE Report message. After receiving Remote UE Report Response message, the relay UE stops the timer T3493 and then completes the Remote UE Report procedure. Details of the Remote UE Report procedure could be found in TS 24.301.

Next, a description will be given of Remote UE Report Notification. A Remote UE Report Notification message is transmitted from an MME to an SGW and from the SGW to an PGW [S1430]. It is used by the MME to inform other network entities that a new remote UE is connected to the UE-to-network relay or disconnected from the UE-to-network relay. The Remote UE Report Notification message may include ID and IP information of the newly connected remote UE, and ID information of the disconnected remote UE. Details of the Remote UE Report Notification message could be found in TS 29.274. After receiving the Remote UE Report Notification message, the PGW or SGW transmits a Remote UE Report Acknowledge message to the MME.

Figure 15:
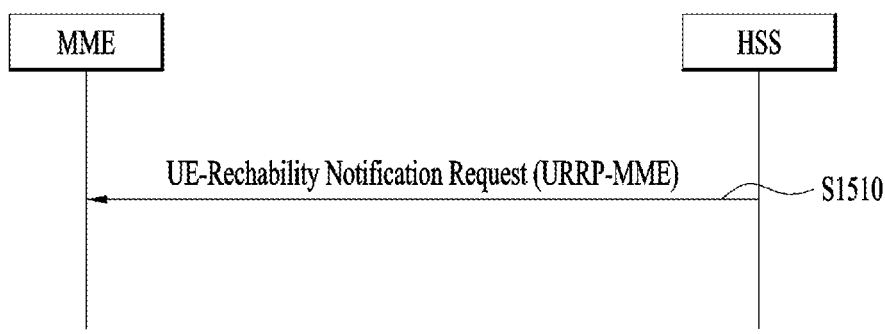
FIG. 15 is a diagram illustrating a UE Reachability Notification Request procedure between network entities.

FIG. 15 is a diagram illustrating a UE Reachability Notification Request procedure between network entities. The UE Reachability Notification Request procedure shown in FIG. 15 corresponds to a procedure in which a HSS requests information on UE's EPS reachability from an MME. The HSS transmits a parameter named as 'UE Reachability Request Parameter-MME (URRP-MME)' to the MME [S1510].

Meanwhile, the UE Reachability Notification Request procedure of FIG. 15 is an example in which signaling is performed between network entities (e.g., MME and HSS) through an S6a interface. Signaling through the S6a interface includes procedures initiated by an MME such as UE location update, UE purge, and the like, procedures initiated by an HSS such as location cancellation, subscriber data insertion, subscribed data deletion, notification, and the like as well as the example shown in the drawing.

4. Proposed D2D Direct Communication Method

Figure 20:
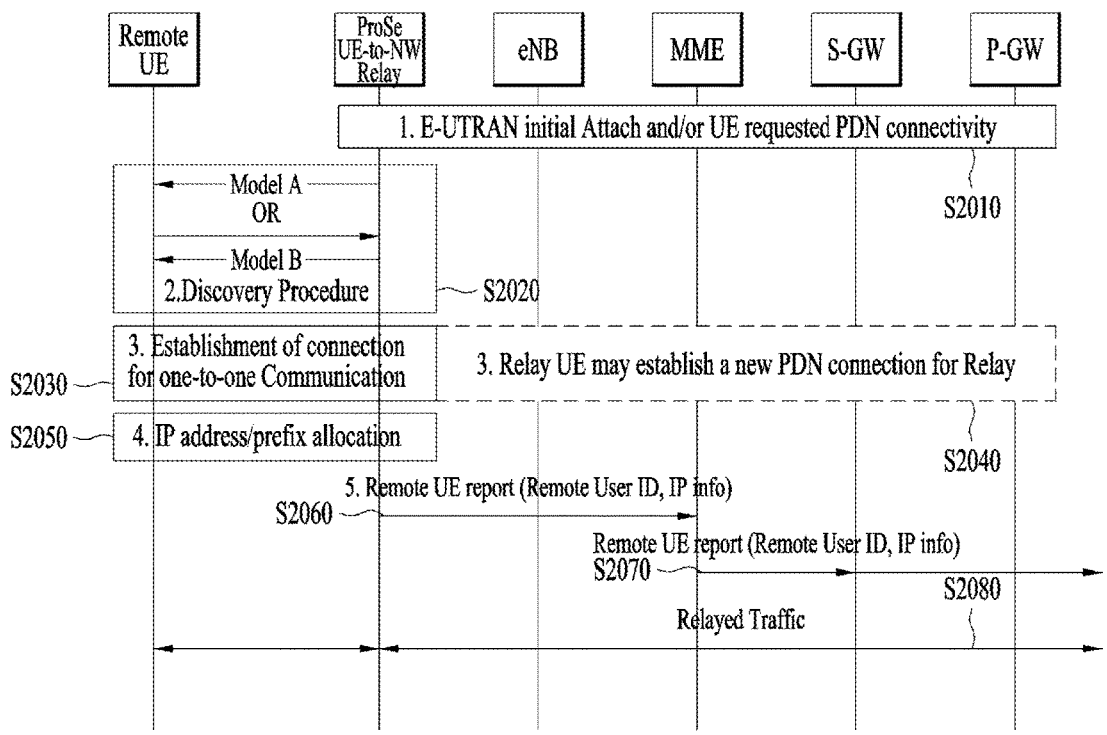
FIGS. 20 and 21 are diagrams for explaining the prior art related to another proposed embodiment.
Figure 21:
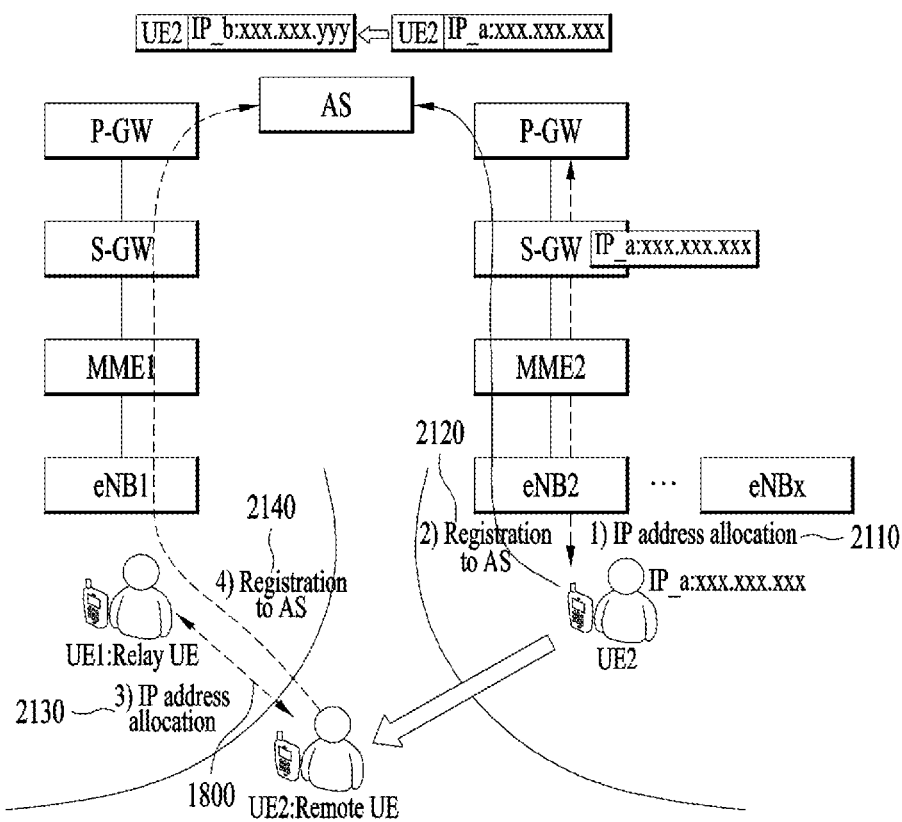
Figure 22:
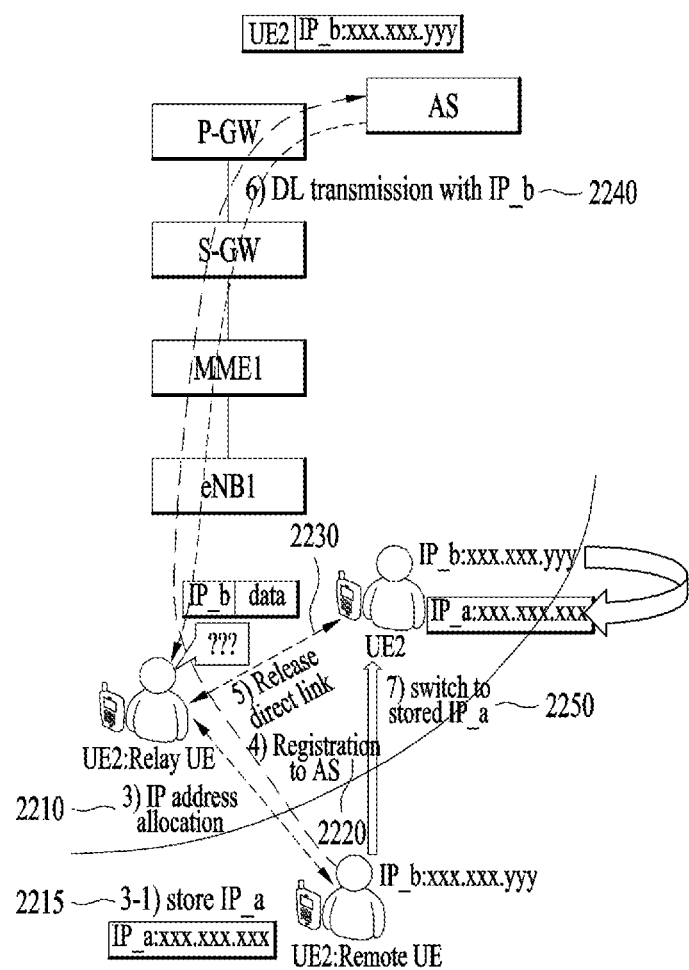
FIG. 22 is a diagram illustrating a direct communication method according to another proposed embodiment.

Hereinafter, embodiments for improving D2D direct communication performed in a ProSe communication environment will be described. FIGS. 16 to 19 show embodiments for minimizing unnecessary paging, and FIGS. 20 to 22 show embodiments for improving an IP allocation procedure for a remote UE.

4.1 Proposed Embodiment 1

Figure 16:
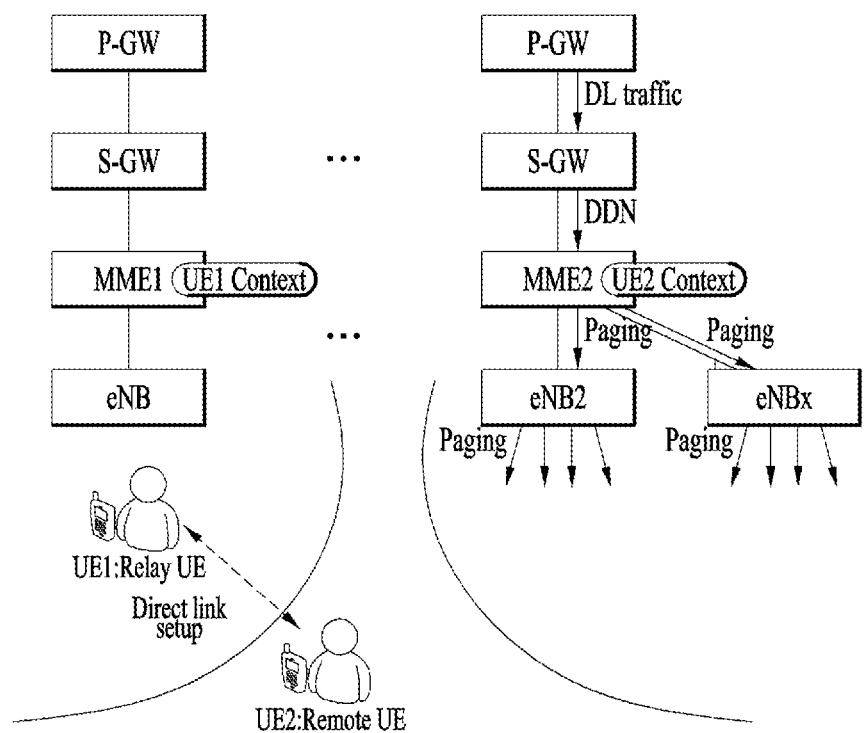
FIG. 16 is a diagram for explaining problems of the prior art related to a proposed embodiment.

FIG. 16 is a diagram illustrating problems of the prior art related to a proposed embodiment. In FIG. 16, UE 2 is a ProSe-enabled UE capable of ProSe direct communication for public safety, that is, the UE 2 is capable of using a UE-to-network relay function. In this case, the UE 2 may communicate with the network in two ways. First, the UE 2 can perform communication through an EPC. That is, if public safety traffic with an application server occurs with respect to the UE 2 located in E-UTRAN coverage, the UE 2 establishes a PDN connection with the EPC through an Uu interface. After establishment of the PDN connection, an IP address is allocated to the UE 2. After being allocated the IP address, the UE 2 sets the corresponding IP address as a source IP address when transmitting data traffic. Then, the UE 2 performs a registration procedure to inform the application server of its IP address. The application server may recognize the IP address of the UE 2 through the registration procedure and use the IP address in communicating with the UE 2. In this case, the UE 2 may also establish a PDN connection and be allocated an IP address for the corresponding PDN connection for other purposes (e.g., Internet, IMS, voice call, etc.) rather than public safety.

On the other hand, the UE 2 can perform communication through a UE-to-network relay. That is, while using public safety services through the EPC, the UE 2 may decide to perform ProSe direct communication through the UE-to-network relay. Specifically, when the UE 2 moves out of the E-UTRAN coverage, the UE 2 may decide to perform the direct communication. In addition, by measuring the signal strength from an eNB, the UE 2 may check whether it is out of the coverage. Meanwhile, the UE 2 operates as a remote UE in the Prose direct communication. To this end, the UE 2 selects UE 1 operating as the UE-to-network relay (i.e., relay UE), and the UE 1 allocates a new IP address to the UE 2. The UE 2 sets the new IP address, which is allocated by the UE 1, as the source IP address and then performs the registration procedure to inform the application server of its new IP address. Thereafter, the application server recognizes the new IP address of the UE 2 and then use the recognized IP address in communicating with the UE 2.

Herein, the IP address allocated by the EPC to the UE 2 is referred to as a first IP address (IP address via EPC), and the IP address allocated by the UE 1 corresponding to the relay UE is referred to as a second IP address (IP address via relay). Meanwhile, if the UE 2 performs the registration procedure to inform the public safety application server of its new IP address while performing the ProSe direct communication using the second IP address, the public safety application server recognizes that the IP address of the UE 2 is changed and then transmit traffic through a newly configured path. However, network entities that have provided services to the UE 2 may still have bearer contexts for the PDN connection, which was generated by the UE 2 for other purposes (e.g., Internet, IMS, voice call, etc.) other than communication with the public safety application server when the UE 2 was in the E-UTRAN coverage. That is, even though the UE 2 moves out of the coverage and then performs the ProSe direct communication, the network entities shown in the right side of FIG. 16 still have all bearer contexts for the previously generated PDN connection.

In this case, since the network entities still have the UE contexts or bearer contexts for the UE 2, there may be a problem that a paging procedure for the UE 2 is unnecessarily repeated. Therefore, to minimize unnecessary signaling, a method for enabling network entities that support a UE to delete context information of the UE or reconfigure a state (or status) of the UE when the UE moves out of coverage will be described hereinafter.

Figure 17:
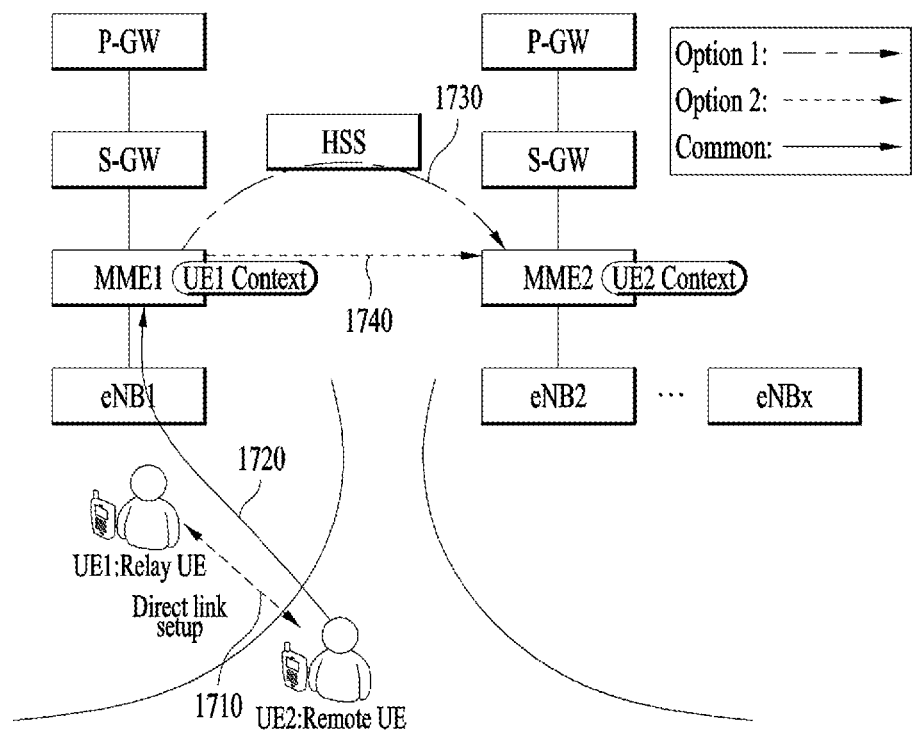
FIGS. 17 to 19 are diagrams illustrating a direct communication method according to a proposed embodiment.
Figure 18:
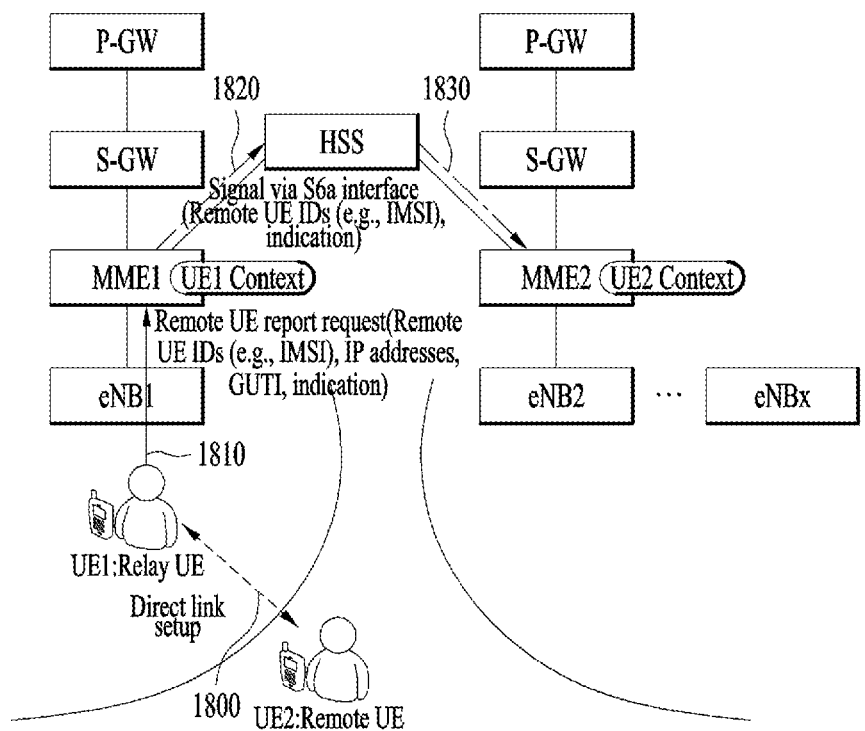
Figure 19:
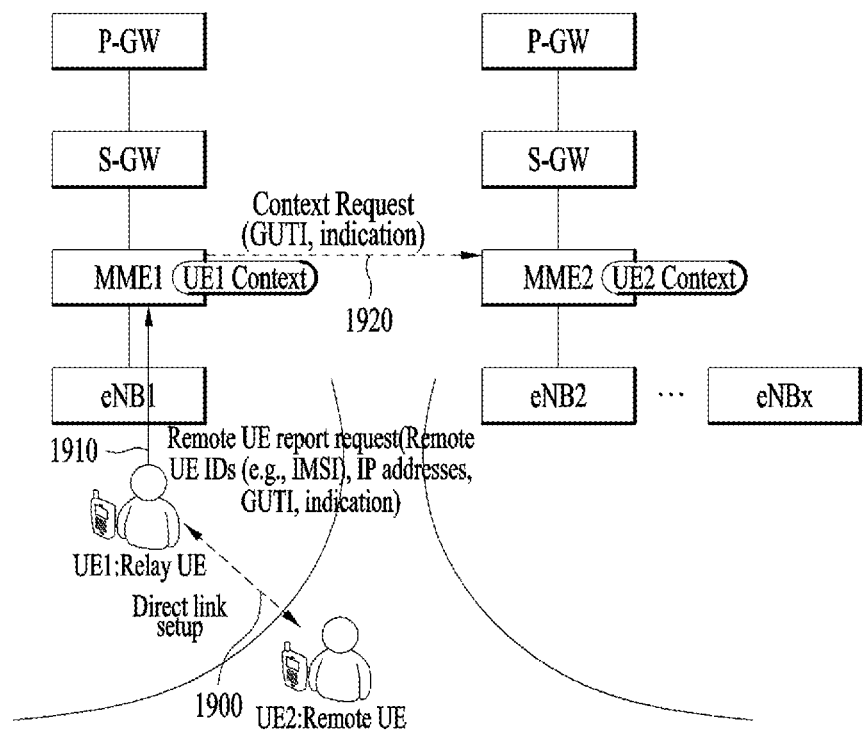

FIGS. 17 to 19 are diagrams illustrating a direct communication method according to a proposed embodiment. According to the proposed embodiment, network entities supporting UE 1 operating as a UE-to-network relay can manage context information of UE 2 connected as a remote UE, thereby minimizing unnecessary portions of the paging procedure.

First, the proposed embodiment will be described in brief. In FIG. 17, when UE 1 establishes a direct connection (link) with the UE 2 [S1710], the UE 1 informs MME 1 (MME supporting the UE 1) that, as the remote UE, the UE 2 is connected to the UE 1 [S1720]. The UE 1 can perform this process by transmitting a Remote UE Report message to the MME 1 as described above. Alternatively, the UE 1 can perform a Tracking Area Update (TAU) procedure for the MME in order to transmit the information on the UE 2 to the MME 1. Further, the UE 1 may transmit a new message or perform a new procedure rather than transmitting the predefined message or performing the existing procedure to transmit the information on the UE 2 corresponding to the remote UE to the MME 1.

Meanwhile, the step S1720 may be performed at various times, for example, after the UEs 1 and 2 perform a discovery procedure, before the UEs 1 and 2 perform a direct communication after the discovery procedure, or after the UEs 1 and 2 perform the direct communication.

Next, the MME 1 forwards the information on the UE, i.e., information on the remote UE connected to the UE 1 to MME 2. To this end, two methods may be used. First, the information indicating that the UE 2 is connected to the UE 1 may be informed the MME 2 through an HSS [S1730]. Second, the corresponding information may be directly transmitted from the MME 1 to the MME 2 [S1740]. In the following description, the two methods will be explained in detail with reference to FIGS. 18 and 19.

Meanwhile, when the MME 2 obtains the information indicating that UE 2 which moves out of coverage is directly connected to the UE 1, the MME 2 may determine that the MME 2 does not need to hold context information of the UE 2 anymore. Thus, the MME 2 may delete all of the context information of the UE through a detach procedure for the UE 2 or delete context information on a specific bearer only through a PDN disconnection procedure. Alternatively, by setting the UE 2 state to 'not reachable', the MME 2 may configure the UE 2 to operate in a mode where the UE 2 does not receive paging although the UE 2 is in an EMM_registered state (similar to power saving mode (PSM)).

In summary, the MME 2 can recognize that the UE 2 does not perform communication through an EPC anymore. Thus, the MME 2 may delete the context information of the UE 2 or configure the state of the UE 2 to prevent unnecessary paging. In addition, the MME 2 may clear a Paging Proceed Factor (PPF) flag of the UE 2. Further, when the MME 2 receives a Downlink Data Notification (DDN) message from an SGW, the MME 2 transmits a DDN Reject message to the SGW.

Hereinafter, the embodiments proposed in FIGS. 18 and 19 will be described in detail. First, a description is given of signaling through an HSS is described.

As described above with reference to FIG. 17, when a direct connection is established between UE 1 and UE 2 [S1800], as a relay UE, UE 1 informs MME 1 that as a remote UE, UE 2 is connected to the UE 1 [S1810]. In this case, a Remote UE Report message (or Remote UE Report Request message) transmitted from the UE 1 to the MME 1 further includes not only an IMSI, as an ID of the UE 2 corresponding to the remote UE, and an IP address of the UE 2 but also a Globally Unique Temporary Identifier (GUTI) of the UE 2 or an ID of the MME 2 (e.g., Globally Unique MME Identifier (GUMMEI)), as information for identifying the MME 2 that supports the UE 2. When the GUTI is included in the Remote UE Report message, the Remote UE Report message includes the GUTI of the UE 2 or the GUMMEI of the MME 2 as the information for identifying the MME 2 because the ID of the MME 2 (i.e., GUMMEI) can be extracted from the GUTI. Since a GUTI is different from an IMSI in that the GUTI further includes information on an MME to which a UE is connected (i.e., the GUMMEI of the MME 2), transmission of the UE 2's GUTI (or MME 2's GUMMEI) from the UE 1 to the MME 1 could be interpreted to mean that the UE 1 transmits the information on the MME 2, which allocates the GUTI to the UE 2, to the MME 1.

Meanwhile, if the message transmitted from the UE 1 to the MME 1 has a form different from that of the Remote UE Report message, the corresponding message may further include an indicator informing that the direct connection between the UEs 1 and 2 has been established as well as the information for identifying the MME 2 (e.g., UE 2's GUTI or MME 2's GUMMEI). On the other hand, since the Remote UE Report message is a message for informing that the UE 2 has been connected, the corresponding indicator may be omitted when the Remote UE Report message is used.

Meanwhile, after receiving, from the UE 1, the information indicating that as the remote UE, the UE 2 has been directly connected to the UE 1, the MME 1 forwards the information on the UE 2 to an HSS through an S6a interface [S1820]. As described in the step S1810, a message transmitted from the MME 1 to the HSS may further include the indicator indicating that, as the remote UE, the UE 2 has been connected to the UE 1. Meanwhile, this indicator may also indicate that since the UE 2 is connected to the network through the ProSe direct communication with the UE 1, the UE 2 does not communicate with an EPC through an Uu interface anymore. Alternatively, this indicator may indicate that the MME supporting the UE 2 (i.e., MME 2) does not need to hold the context information of the UE 2 anymore or that the MME 2 should set the state of the UE 2 to 'not reachable'.

Moreover, the message transmitted from the MME 1 to the HSS may further include at least one of the UE 2's GUTI and the MME 2's ID (GUMMEI) in addition to the above-mentioned indicator. Since the UE 2's GUTI includes information on an MME ID of the MME 2 that allocates the GUTI, the HSS can check the MME supporting the UE 2 through anyone of the GUTI and GUMMEI. Meanwhile, a message previously defined for the S6a interface can be used as the message transmitted from the MME 1 to the HSS, and a new message defined related to the proposed embodiment can also be used.

Next, based on the message received from the MME 1, the HSS checks that the MME to which the UE 2 is connected is the MME 2 and then forwards the indicator included in the message received from the MME 1 to the MME 2 [S1830]. That is, since the MME 2 does not need to hold the context information of the UE 2, the HSS forwards, to the MME 2, the indicator indicating that the MME 2 should delete the context information of the UE 2 or set to the state of the UE 2 to 'not reachable'. After receiving the message, the MME (MME 2) detaches the connection with the UE 2, deletes the context information of the UE 2, or sets the UE 2's state to 'not reachable' as described above to prevent paging for the UE 2 from being performed again.

Next, an embodiment in which signaling is performed without passing through an HSS will be described with reference to FIG. 19. Since steps S1900 and S1910 of FIG. 19 are similar to the steps S1800 and S1810 of FIG. 18, details will be omitted.

After receiving a Remote UE Report Request message from UE 1, MME 1 checks that as a remote UE, UE 2 has been connected to the UE 1. Meanwhile, since the MME 1 receives, from the UE 1, an GUTI of the UE 2 or an ID of MME 2 (i.e., GUMMEI), the MME 1 can know that the MME 2 holds context information of the UE 2. When it is determined that the MME 1 can directly transmits a message to the MME 2 due to an interface established between the MME 1 and MME 2, the MME 1 directly transmit a message to the MME 2. Otherwise, the MME 1 transmits a message through an HSS as described above. When the MME 1 can directly transmit a message to the MME 2, the MME 1 transmits, to the MME 2, a message including an indicator indicating that as the remote UE, the UE 2 has been connected to the UE 1 [S1920]. Meanwhile, this indicator may also indicate that since the UE 2 performs ProSe direct communication with the UE 1, the UE 2 does not perform communication with an EPC through an Uu interface. Alternatively, this indicator may indicate that an MME supporting the UE 2 (i.e., MME 2) does not need to hold the context information of the UE 2 anymore or that the MME 2 should set the state of the UE 2 to 'not reachable'.

As the message transmitted from the MME 1 to the MME 2 in the step S1920, a context request message between MMEs can be used, or a new message defined related to the proposed embodiment can also be used. As described above with reference to FIG. 18, after receiving the message from the MME 1, the MME 2 detaches the connection with the UE 2, deletes the context information of the UE 2, or sets the state of the UE 2 to 'not reachable' to prevent paging for the UE 2 from being performed again.

Hereinabove, with reference to FIGS. 17 to 19, cases in which the MME supporting the UE 1 (i.e., MME 1) is different from that supporting the UE 2 (i.e., MME 2) have been described. However, the UE 1 and UE 2 may be supported by the MME 1. In this case, since operations required for the UE 2 can be performed by the MME 1, it is possible to simplify the above-described procedure. That is, the MME 1 may delete the context information of the UE 2, detach the connection with the UE 2, or set the state of the UE 2 to 'not reachable' in order to skip paging for the UE 2.

According to a proposed embodiment, by managing context information of a UE that establishes a direct connection with a UE operating as a UE-to-network relay, it is possible to reduce signaling overhead of a paging procedure for an out-of-coverage UE.

4.2 Proposed Embodiment 2

FIGS. 20 and 21 are diagrams for explaining the prior art related to another proposed embodiment. Specifically, FIG. 20 shows a procedure for performing direct communication with a UE operating as a UE-to-network relay, and FIG. 21 shows a procedure for allocating an IP address for a remote UE.

Referring to FIG. 20, a relay UE establishes a PDN connection through initial access to an E-UTRAN [S2010] and performs a discovery procedure (either Model A or Model B) together with a remote UE [S2020]. When a direct connection between the remote UE and relay UE is established through the discovery procedure [S2030], the relay UE establishes a new PDN connection for the remote UE through the network [S2040].

Next, the relay UE allocates an IP address and a prefix of the newly established PDN connection to the remote UE [S2050] and then performs a Remote UE Report procedure to inform an MME that the remote UE is connected to the relay UE [S2060]. The MME performs a Remote UE Report Notification procedure to inform an SGW and a PGW that the new remote UE is connected [S2070]. Thereafter, the remote UE performs communication with the network through the relay UE [S2080].

FIG. 21 shows a series of steps for registering a new IP address, which is allocated to a remote UE as described in the step S2050 of FIG. 20, to an application server. In FIG. 20, UE 2 is allocated an IP address in E-UTRAN coverage [2110] and then registers the IP address (IP_a) to the application server [2120]. Meanwhile, when the UE 2 moves out of the E-UTRAN coverage, the UE 2 may establish a direct connection with UE 1 operating as a relay UE. By doing so, the UE 2 is allocated a new IP address (IP_b) by the UE 1 [2130] and registers the newly allocated IP address to the application server [2140]. That is, when the UE 2 is allocated the new IP address, the UE 2 triggers a procedure for registering the new IP address to the application server. Thereafter, if the registration procedure is successfully completed, the application server may recognize that the current IP address of the UE 2 is changed from the previous IP address (IP_a) to the new IP address (IP_b). Afterwards, the application server transmits traffic using the new IP address (IP_b).

FIG. 22 is a diagram illustrating a direct communication method according to another proposed embodiment. In the situation depicted in FIG. 21, the UE 2 has no problem in communicating with the application server through the UE 1. However, when the UE 2 enters the E-UTRAN coverage again, the following matters should be considered. When the UE 2 initiates communication through an Uu interface while communicating with the UE 1 through a PC5 interface, network entities do not allocate a new IP address for the UE 2 because the network entities have context information on the UE 2's PDN connections. In this case, since the UE 2's IP address is not automatically changed from the IP address (i.e., IP_b) allocated by the UE 1 to the IP address (i.e., IP_a), which was allocated by the EPC, there may be a problem that the registration procedure to the application server is not triggered.

First, while the remote UE is allocated the new IP address (IP_b) after the establishment of the direct connection with the relay UE, the remote UE does not delete but stores the previous IP address (IP_a), which was allocated when the remote UE was in the EPS coverage [2210 and 2215]. That is, while the remote UE registers the new IP address to the application server and performs communication through the relay UE [2220], the relay UE stores/memorizes the previously allocated IP address.

Meanwhile, when the UE 2 moves into the E-UTRAN coverage again, the UE 2 can perform communication through the EPC and Uu interface. In addition, since the UE 2 is unable to perform the direct communication through the UE 1 due to a Reference Signal Received Power (RSRP) condition associated with an eNB, the UE 2 release the direction link with the UE 1 [S2230]. However, since the UE 2's IP address registered in the application server is still the IP_b, it is necessary to minimize unnecessary signaling, i.e., traffic transmitted by the application server using the IP_b [2240]. That is, if the UE 2 changes the current IP address from the IP address (IP_b) allocated by the UE 1 to the stored IP address (IP_a) and then registers the changed IP address to the application server, the UE 2 can skip a procedure for new IP address allocation.

To this end, a condition for triggering the UE 2 to change the IP address needs to be defined. According to the proposed embodiment, the condition for triggering the IP address change may be defined as follows. That is, when the UE 2 enters a 'EMM-REGISTERED.NORMAL-SERVICE' state after releasing the direction connection, the UE 2 can change the IP address.

If the UE 2 release the direct connection, it may imply that the UE 2 enters the EPS coverage. In addition, if the UE enters the 'EMM-REGISTERED.NORMAL-SERVICE' state, it may imply that a TAU procedure in accordance with the UE'2 entrance is successfully performed. That is, if the UE successfully completes the TAU procedure with the network after entering the EPS coverage, the UE 2 changes the current IP address to the stored IP address and then registers the changed IP address to the application server in order to inform the application server of the changed IP address. Next, the UE 2 change a protocol stack corresponding to the PC5 interface to a protocol stack corresponding to the Uu interface and communicates with the network by applying EPC-related contexts.

Meanwhile, the UE 2 transmits a registration message to inform the application server that the IP address is changed because the triggering condition for the IP address change is satisfied. In addition, before receiving the registration message, the application server may transmit traffic through the IP address (IP_a) allocated by the UE 1. Such traffic may cause unnecessary resource consumption not only between the network entities but also to an Uu section of the UE, and it may not arrive at the UE 2.

To prevent this problem, when the UE 1 releases the direction connection, the UE 2 may inform the application server that the UE 2 cannot perform reception through the IP address (IP_b) allocated by the UE 1 because its state is changed (or switched). Alternatively, the UE 2 may transmit a message including an indicator indicating that the UE 2 cannot perform reception through the previously allocated IP address (IP_b). After receiving the message, the application server may stop the traffic transmission through the previous IP address (IP_b). By doing so, it is possible to prevent the problem where the application server transmits traffic through the previously allocated IP address (IP_b) even after the direct connection between the UE 1 and UE 2 is released.

5. Device Configurations

FIG. 23 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 23, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned direct communication method can be applied to not only the 3GPP system but also various wireless communication systems including an IEEE 802.16x system and IEEE 802.11x system. Further, the proposed method can also be applied to an mmWave communication system using super-high frequency band.

What is claimed is:

1. A method for supporting direct communication between Proximity Service-enabled User Equipments (ProSe-enabled UEs) by a first network entity in a wireless communication system, the method comprising:
   receiving, from a relay UE, a first message that includes information indicating that since a direct connection with a remote UE that moved out of coverage of a first network is established, paging to the remote UE is not required; and
   transmitting, to a second network entity, a second message that includes information that indicates to a Mobility Management Entity (MME) in a second network that supported the remote UE, paging to the remote UE is not required since there is a direct connection between the remote UE and the relay UE, wherein each of the first and second messages comprises an identifier of the MME that supported the remote UE and an indicator indicating that the remote UE is connected to the first network through the relay UE.

2. The method of claim 1, wherein each of the first and second messages comprises the identifier of the MME that supported the remote UE as a Globally Unique Temporary Identifier (GUTI) of the remote UE or a Globally Unique MME Identifier (GUMMEI) of the MME.

3. The method of claim 1, wherein the indicator indicates that the MME that supported the remote UE will delete context information of the remote UE, that the MME that supported the remote UE will detach a connection with the remote UE, or that the MME that supported the remote UE will set a state of the remote UE to 'not reachable'.

4. The method of claim 1, wherein the first network entity is an MME supporting the relay UE and the second network entity is a Home Subscriber Server (HSS), and wherein the first message is a Remote UE Report Request message and the second message is a message transmitted through an S6a interface.

5. The method of claim 1, wherein when receiving the second message from the second network entity, the MME that supported the remote UE stops the paging to the remote UE.

6. A first network entity for supporting direct communication between Proximity Service-enabled User Equipments (ProSe-enabled UEs) in a wireless communication system, the first network entity comprising:
   a transmitter;
   a receiver; and
   a processor connected to the transmitter and the receiver, wherein the processor is configured to:
   receive, from a relay UE, a first message that includes information indicating that since a direct connection with a remote UE that moved out of coverage of a first network is established, paging to the remote UE is not required; and
   transmit, to a second network entity, a second message that includes information that indicates to a Mobility Management Entity (MME) in a second network that supported the remote UE, paging to the remote UE is not required since there is a direct connection between the remote UE and the relay UE, wherein each of the first and second messages comprises an identifier of the MME that supported the remote UE and an indicator indicating that the remote UE is connected to the first network through the relay UE.

7. The first network entity of claim 6, wherein each of the first and second messages comprises the identifier of the MME that supported the remote UE as a Globally Unique Temporary Identifier (GUTI) of the remote UE or a Globally Unique MME Identifier (GUMMEI) of the MME.

8. The first network entity of claim 6, wherein the indicator indicates that the MME that supported the remote UE will delete context information of the remote UE, that the MME that supported the remote UE will detach a connection with the remote UE, or that the MME that supported the remote UE will set a state of the remote UE to 'not reachable'.

9. The first network entity of claim 6, wherein the first network entity is an MME supporting the relay UE and the second network entity is a Home Subscriber Server (HSS), and wherein the first message is a Remote UE Report Request message and the second message is a message transmitted through an S6a interface.

10. The first network entity of claim 6, wherein when receiving the second message from the second network entity, the MME that supported the remote UE stops the paging to the remote UE.

11. A communication method for a relay User Equipment (UE) corresponding to a Proximity Service-enabled (ProSe-enabled) UE in a wireless communication system, the method comprising:
    establishing a direct connection with a remote UE that moved out of coverage of a first network;
    transmitting, to a first network entity, a first message that includes information indicating that since a direct connection with the remote UE is established, paging to the remote UE is not required; and
    transmitting, to a second network entity, a Remote UE Report Request message that includes information that indicates, to a Mobility Management Entity (MME) in a second network that supported the remote UE, that since the direct connection with the remote UE is established paging to the remote UE is not required,
    wherein the Remote UE Report Request message includes an identifier of the MME that supported the remote UE and an indicator indicating that the remote UE is connected to the first network through the relay UE.

12. The method of claim 11, wherein the Remote UE Report Request message includes the identifier of the MME that supported the remote UE as a Globally Unique Temporary Identifier (GUTI) of the remote UE or a Globally Unique MME Identifier (GUMMEI) of the MME.

13. The method of claim 11, wherein the indicator indicates that the MME that supported the remote UE will delete context information of the remote UE, that the MME that supported the remote UE will detach a connection with the remote UE, or that the MME that supported the remote UE will set a state of the remote UE to 'not reachable'.

14. The method of claim 11, wherein the first network entity is an MME supporting the relay UE.

15. A relay User Equipment (UE) corresponding to a Proximity Service-enabled (ProSe-enabled) UE in a wireless communication system, the relay UE comprising:
   a transmitter;
   a receiver; and
   a processor connected to the transmitter and the receiver, wherein the processor is configured to:
   establish a direct connection with a remote UE that moved out of coverage of a first network;
   transmit, to a first network entity, a first message that includes information indicating that since a direct connection with the remote UE is established, paging to the remote UE is not required; and
   transmit, to a second network entity, a Remote UE Report Request message that includes information that indicates, to a Mobility Management Entity (MME) in a second network that supported the remote UE, that since the direct connection with the remote UE is established paging to the remote UE is not required,
   wherein the Remote UE Report Request message includes an identifier of the MME that supported the remote UE and an indicator indicating that the remote UE is connected to the first network through the relay UE.

16. The relay UE of claim 15, wherein the Remote UE Report Request message comprises the identifier of the MME that supported the remote UE as a Globally Unique Temporary Identifier (GUTI) of the remote UE or a Globally Unique MME Identifier (GUMMEI) of the MME.

17. The relay UE of claim 15, wherein the indicator indicates that the MME that supported the remote UE will delete context information of the remote UE, that the MME that supported the remote UE will detach a connection with the remote UE, or that the MME that supported the remote UE will set a state of the remote UE to 'not reachable'.

18. The relay UE of claim 15, wherein the first network entity is an MME supporting the relay UE.

19. The method of claim 1, wherein the first network entity is an MME supporting the relay UE and the second network entity is the MME that supported the remote UE.

20. The first network entity of claim 6, wherein the first network entity is an MME supporting the relay UE and the second network entity is the MME that supported the remote UE.

* * * * *